United States Patent
Hossain

(10) Patent No.: US 9,838,061 B1
(45) Date of Patent: Dec. 5, 2017

(54) PORTABLE ELECTRONIC COMMUNICATIONS DEVICE WITH HUMAN TISSUE CONTACT DETECTION

(71) Applicant: LENOVO (SINGAPORE) PTE. LTD., Singapore (SG)

(72) Inventor: MdGolam Sorwar Hossain, Tokyo (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/349,053

(22) Filed: Nov. 11, 2016

(51) Int. Cl.
*H04B 1/3827* (2015.01)
*H04M 1/02* (2006.01)

(52) U.S. Cl.
CPC ........ *H04B 1/3838* (2013.01); *H04M 1/0202* (2013.01); *H04M 2250/12* (2013.01)

(58) Field of Classification Search
CPC ............................... H04B 1/3838; H04B 1/04
See application file for complete search history.

(56) References Cited

U.S. PATENT DOCUMENTS

| | | | |
|---|---|---|---|
| 2011/0012793 A1* | 1/2011 | Amm | H01Q 1/243 343/702 |
| 2012/0214412 A1 | 8/2012 | Schlub et al. | |
| 2013/0033400 A1 | 2/2013 | Chaing | |
| 2014/0015595 A1 | 1/2014 | Van Ausdall | |
| 2015/0116169 A1* | 4/2015 | Ying | H01Q 21/28 343/729 |

OTHER PUBLICATIONS

SEMTECH Data Sheet SX9300, Ultra Low Power, Dual Channel Smart Proximity SAR Compliant Solution, Revision 4, Feb. 5, 2014. Semtech Corporation Wireless and Sensing Products ivision, 200 Flynn Road, Camarillo, CA 93012, USA.

* cited by examiner

*Primary Examiner* — Tuan H Nguyen
(74) *Attorney, Agent, or Firm* — Shimokaji IP

(57) ABSTRACT

An electronic communications device includes a radio frequency (RF) transceiver, an RF antenna, a millimeter wave (mmW) antenna and a processor. The RF antenna has dielectric-object proximity-sensing capability. The processor is a) coupled to the RF antenna to receive capacitance variation signals from the RF antenna; b) coupled to the mmW antenna to receive distance to the object signals from the mmW antenna; and c) coupled to the RF transceiver to produce power reduction signals to the RF transceiver.

12 Claims, 4 Drawing Sheets

PORTABLE ELECTRONIC COMMUNICATIONS DEVICE WITH HUMAN TISSUE CONTACT DETECTION

BACKGROUND OF THE INVENTION

The present invention relates generally to methods and apparatus for controlling radio frequency (RF) energy output from a portable electronic communication device. More particularly, the invention relates to systems for reducing RF output when the device is in proximity with human tissue.

Electronic devices such as tablets and mobile phones employ proximity sensing (p-sensor) antennas to transmit and receive RF power. When a typical p-sensor antenna detects proximity to an object with a high dielectric constant, a control circuit within the device interprets that detected proximity as presence of human tissue. RF power is then reduced to a level that is in compliance with regulatory requirements.

Unfortunately, conventional p-sensor antennas cannot distinguish between human tissue and other high dielectric objects like a desk or a book. Thus a device with a conventional p-sensor antenna enters dynamic power reduction (DPR) mode with detection of any high dielectric object. For example, putting the device on the desk or metallic surface will keep the DPR function running with low RF power. This often causes network disconnection and low throughput issues.

As can be seen, there is a need for an electronic communications device that may reduce RF power output only when in proximity to human tissue. More particularly, there is a need for an antenna system for such a device which is capable of distinguishing between proximity to an inanimate object and proximity to human tissue.

SUMMARY OF THE INVENTION

In one aspect of the present invention, an electronic communications device comprises a radio frequency (RF) transceiver; an RF antenna, the RF antenna having high-dielectric object proximity-sensing capability; a millimeter wave (mmW) antenna; and a processor, a) coupled to the RF antenna to receive capacitance variation signals from the RF antenna; b) coupled to the mmW antenna to receive distance to the object signals from the mmW antenna; and c) coupled to the RF transceiver to produce power reduction signals to the RF transceiver.

In another aspect of the present invention, an antenna system for a portable electronic communications device comprises an RF antenna, the RF antenna having high-dielectric object proximity-sensing capability; and a millimeter wave (mmW) antenna; wherein the RF antenna and the mmW antenna are coupled to a processor; and wherein both the RF antenna and the mmW antenna provide signals to the processor which signals are indicative of proximity of an object with a high dielectric constant.

In still another aspect of the present invention, a method for controlling power output from an electronic communication device comprises the steps of: generating object-proximity signals; generating distance-to-object signals; combining the object-proximity and the distance-to-object signal to distinguish proximity of an inanimate object from proximity of human tissue; and reducing RF power output from the electronic communication device responsively to the signals only if the object is human tissue.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally may provide an electronic communications device that may reduce RF power output when the electronic device is in proximity to human tissue. More particularly, the present invention provides an antenna system for such a device which is capable of distinguishing between proximity to an inanimate object and proximity to human tissue.

Figure 1:
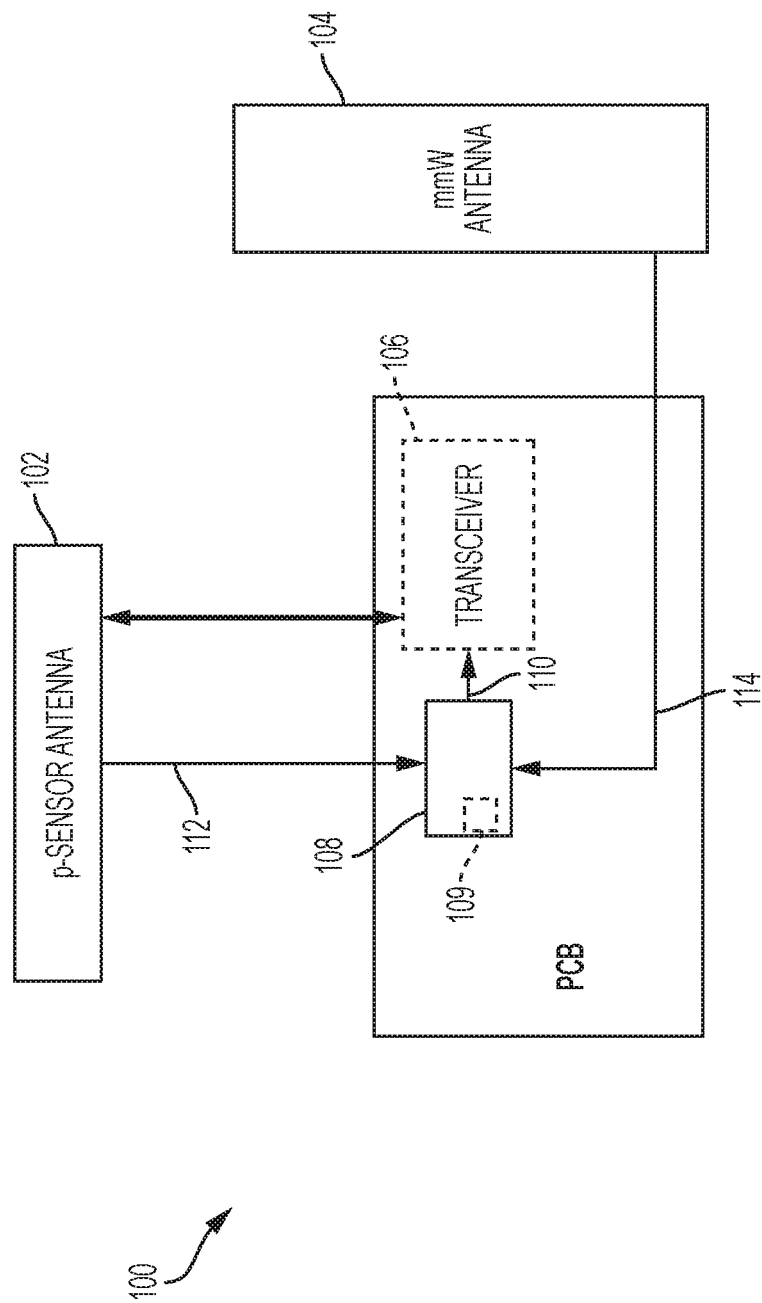
FIG. 1 is a schematic block diagram of an electronic communications device in accordance with an exemplary embodiment of the invention.

Referring now to FIG. 1, an exemplary embodiment of an electronic communications device 100 is shown in a simplified block diagram format. The device 100 may include a multi-element radio frequency (RF) power antenna 102 with object-proximity sensing capability and may be referred to hereinafter as a proximity sensing antenna or p-sensor antenna 102 or an RF antenna 102. The device 100 may also include a millimeter wave (mmW) antenna 104, a transceiver block 106 and a radio frequency (RF) power control processor block. 108 (referred to hereinafter as the processor 108). The processor 108 may include a look-up table 109 stored in a non-volatile memory. As explained later hereinbelow, the processor 108 may provide a dynamic power reduction (DPR) signal 110 to the transceiver block 106 responsively to signals 112 from the p-sensor antenna 102 and signals 114 from the mmW antenna 104

The p-sensor antenna 102 may include multiple antenna elements (not shown). These antenna elements may produce a discernible variation in their collective capacitance when the p-sensor antenna 102 is near an object having a high dielectric constant. This discernible capacitance variation may be manifested as a capacitance variation signal 110 or object-proximity signal 110. The signal 110 may intensify as the object is moved closer to the p-sensor antenna 102. In this regard, the p-sensor antenna 102 may function in a manner that is well known to those skilled in the art.

It is known that human tissue typically has a dielectric constant lower than that of an inanimate object such a desk surface or a book or other object which may be near the electronic device. Thus, one might expect that when the p-sensor antenna 102 is near human tissue, capacitance variation would be relatively higher than that which would develop when the p-sensor antenna 102 is near an inanimate object. It must be noted, however, that capacitance variation of the p-sensor antenna 102 is not a function only of dielectric constant of an object. The capacitance variation of the p-sensor antenna 102 is also a function of its distance from the object. As the object is moved closer to the p-sensor antenna 102, the capacitance variation of the p-sensor antenna 102 increases. Consequently, as the object is moving toward the p-sensor antenna 102, the p-sensor antenna 102 may not be capable of distinguishing proximity of human tissue from proximity of an inanimate object. As explained hereinbelow, this is because distance-related differences in capacitance variation may exceed human tissue vs. inanimate object differences. In other words, the human vs. inanimate capacitance variations differences may be masked by the distance-related differences.

Figure 2:
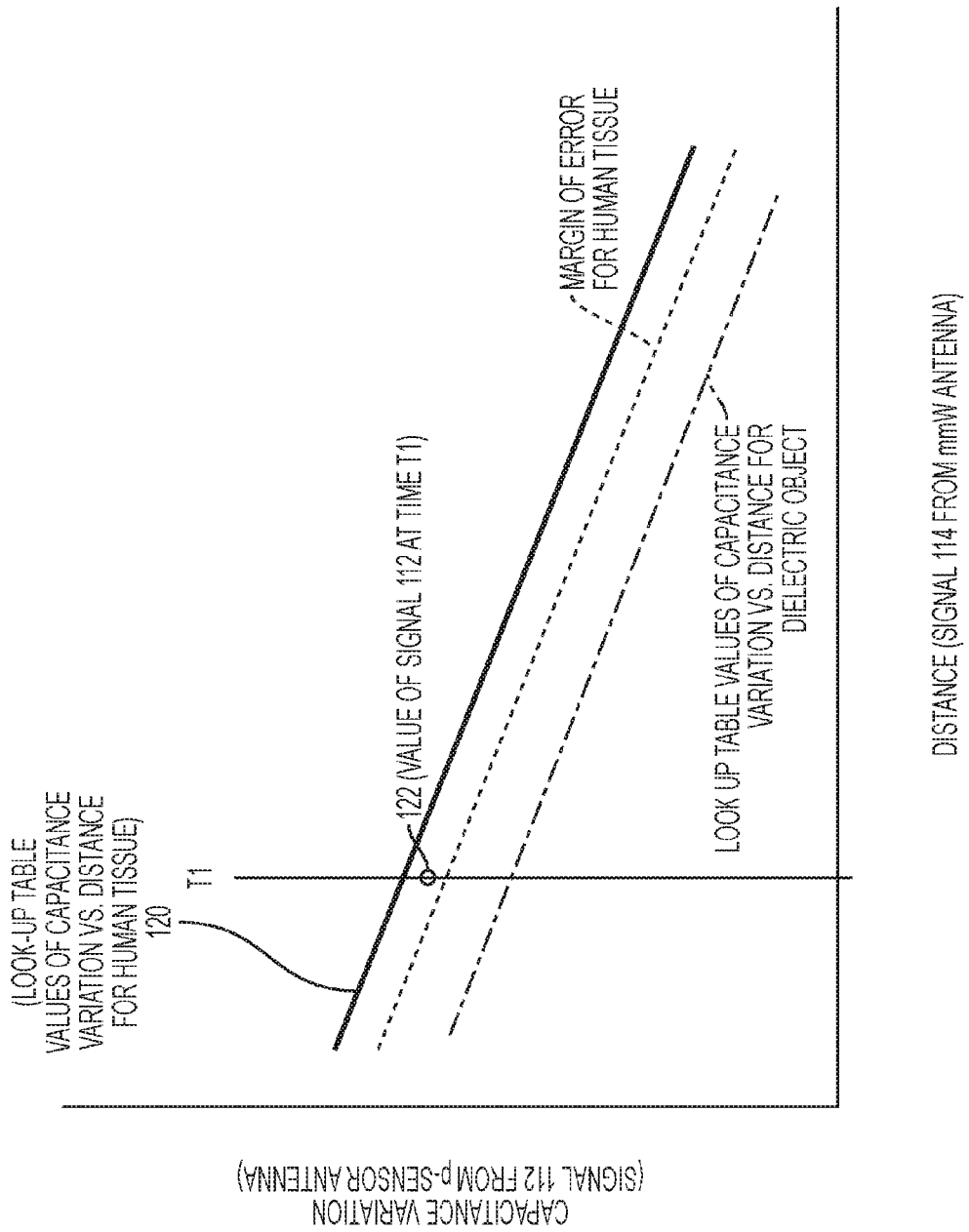
FIG. 2 is a graph illustrating an operational feature of the device of FIG. 1 in accordance with an exemplary embodiment of the invention.

Referring now to FIG. 2, it may be seen that the mmW antenna 104 may be employed to eliminate this masking. The mmW antenna 104 may transmit and receive mmW energy during movement of an object toward the mmW antenna 104. The mmW antenna 104 may produce signal 114 which signal may be indicative of distance between the object and the mmW antenna 104. In that regard, the signals 114 may be considered distance-to-object signals. The processor 108 may continuously monitor signals 114. In an exemplary embodiment, the signals 114 from the mmW antenna 104 may be time stamped in the processor 108. Signals 112 from the p-sensor antenna 102 may also be time stamped in the processor 108. Thus, at any selected time, a value of the signal 114 may be correlated with a value of the signal 112. The look-up table 109 may relate human-tissue related capacitance variation of the p-sensor antenna 102 (i.e., signals 112) with distance to the object (i.e., signals 114). See graph line 120. The signal 112 from the p-sensor antenna 102 may be processed through use of the look-up table 109 so that distance-related differences in capacitance variation do not mask human tissue vs. inanimate-object differences.

In an example illustrated in FIG. 2, a value of signal 112 taken at a time T1 is shown as point 122. The point 122 is higher than a corresponding value of capacitance variation might be for an inanimate object at the time T1. The point 122 is less than the value for human tissue at the Time T1, but the point 122 is within a margin of error. Under the conditions illustrated in FIG. 2, the processor 108 may produce a DPR signal 110 to the transceiver 106 and RF power to the p-sensor antenna 102 may be reduced. If the value of signal 112 had been less than the look-up table value for inanimate objects at time T1 then the DPR signal 110 may not have been produced.

Figure 3:
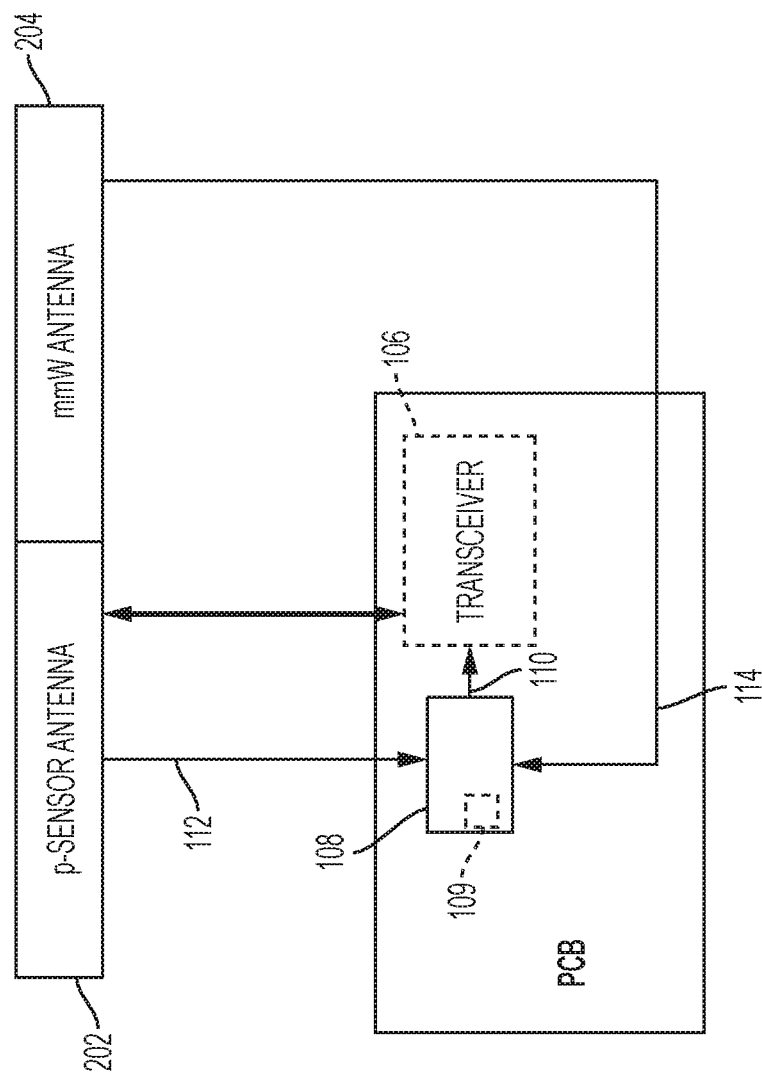
FIG. 3 is a schematic block diagram of an electronic communications device in accordance with a second exemplary embodiment of the invention.

Referring now to FIG. 3, a second exemplary embodiment of an electronic communications device 200 is shown in a simplified block diagram format. The device 200 may include a p-sensor antenna 202, a millimeter wave (mmW) antenna 204, a transceiver block 106 and a processor 108. As explained above with respect to FIGS. 1 and 2, the processor 108 may provide a dynamic power reduction (DPR) signal 110 to the transceiver block 106 responsively to signals 112 from the p-sensor antenna 202 and signals 114 from the mmW antenna 204.

It may be noted that the antennas 202 and 204 may be combined together in the device 200. Such an integration of the antennas 202 and 204 may help with the miniaturization of the device.

Figure 4:
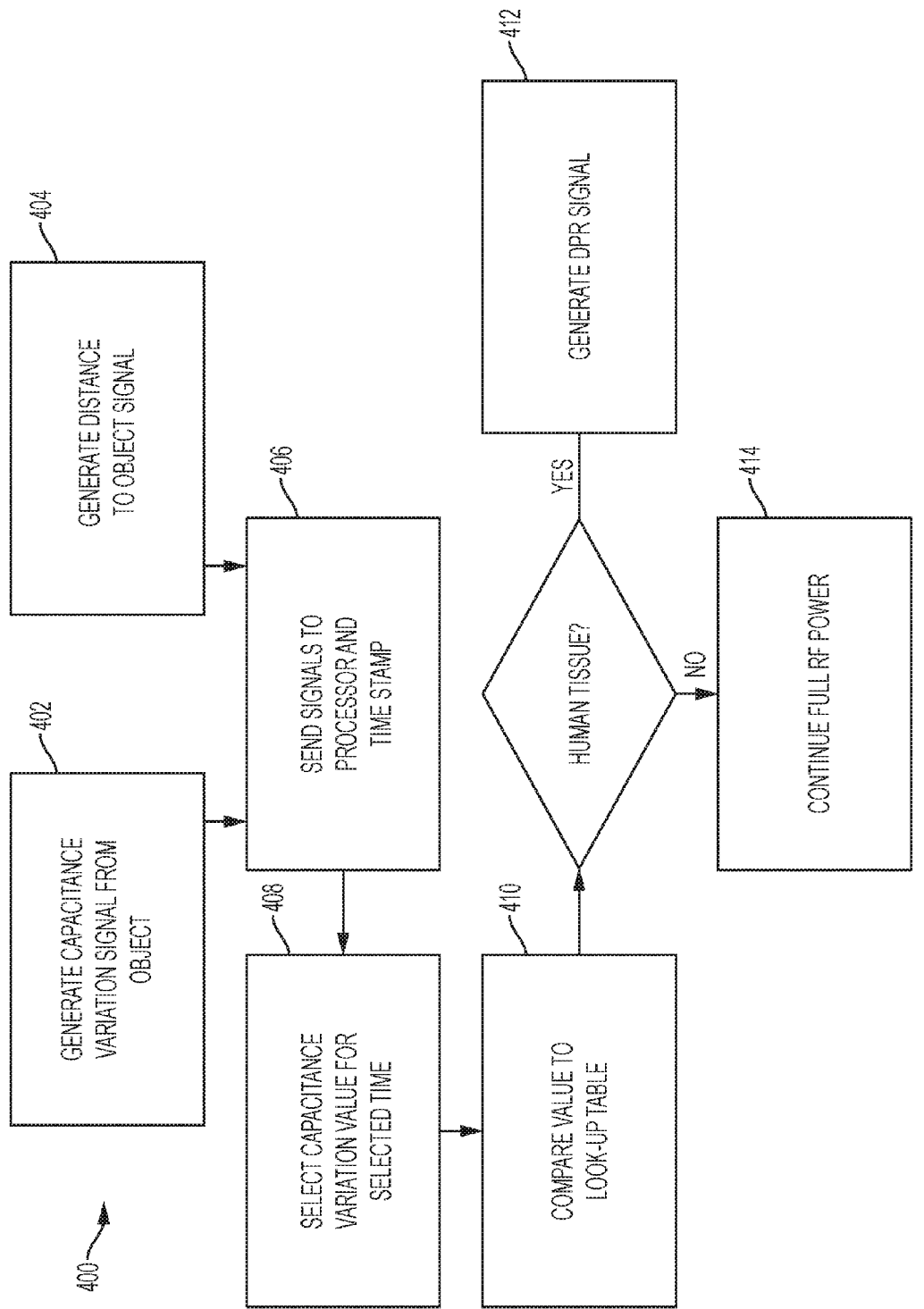
FIG. 4 is a flow chart of a method for controlling power output from the electronic communications device in accordance with an exemplary embodiment of the invention.

Referring now to FIG. 4, a flow chart illustrates a method 400 for controlling power output from an electronic communication device. In a step 402, object-proximity signals may be generated (e.g., the p-sensor antenna 102 or 204 may produce capacitance variation signals 112 when an object with a high dielectric constant is positioned near the p-sensor antenna 102). In a step 404, distance-to-object signals may be generated (e.g., the mmW antenna 104 or 204 may generate signals 114 when an object is positioned near the mmW antenna 104 or 204). In a step 406, the object-proximity signals and the distance-to-object signals may be sent to a processor and time stamped (e.g., the signals 112 and the signals 114 may sent to the processor 108 and time stamped by the processor 108).

In a step 408, one of the stamped times and a corresponding one of object-proximity signals may be selected. In a step 410, the value of selected one of the object-proximity signals may be compared to predetermined values stored in a non-volatile memory of the processor (e.g., a capacitance variation value for the selected time is compared a table of distance vs. capacitance variation values in the look-up table 109, i.e., graph line 120). In a step 412, a power reduction signal may be generated if the object is determined to be human tissue (e.g., the processor 108 may generate the DPR signal 110 to the transceiver 106 to reduce RF power). In a step 414, the device 100 or 200 may continue to operate at full RF power if the object is determined not to be human tissue (e.g. if the value of capacitance variation at the selected time is below the lock-up table value corresponding to human tissue, then full power operation may continue, i.e., below graph line 120 and a margin of error).

It should be understood, of course, that the foregoing relates to exemplary embodiments of the invention and that modifications may be made without departing from the spirit and scope of the invention as set forth in the following claims.

I claim:

1. An electronic communications device, comprising:
   a radio frequency (RF) transceiver;
   an RF antenna having dielectric-object proximity-sensing capability;
   a millimeter wave (mmW) antenna; and
   a processor that is:
   a) coupled to the RF antenna to receive capacitance variation signals from the RF antenna;
   b) coupled to the mmW antenna to receive distance-to-object signals from the mmW antenna; and
   c) coupled to the RF transceiver to produce power reduction signals to the RF transceiver;
   wherein the processor time stamps the capacitance variation signals and the distance-to-object signals,
   wherein the processor combines the time-stamped capacitance variation signals with the time-stamped distance-to-object signals to distinguish proximity of an inanimate object from proximity of a human tissue object,
   wherein the processor sends the power reduction signals responsively to the time-stamped capacitance variation signals and the time-stamped distance-to-object signals only when the object is human tissue.

2. The device of claim 1 wherein the processor includes a non-volatile memory with a stored relationship between the capacitance variation resulting from proximity to the human tissue object and distance of the human tissue object from the mmW antenna.

3. The device of claim 2 wherein the relationship is stored in a look-up table.

4. The device of claim 1 wherein the RF antenna is a multiple element antenna.

5. The device of claim 1 wherein the RF antenna and the mmW antenna are in contact with one another.

6. The device of claim 1 wherein the RF antenna and the mmW antenna are coupled with one another.

7. The device of claim 1 wherein the RF antenna and the mmW antenna are separated from one another.

8. An antenna system for a portable electronic communications device, comprising:
   an RF antenna having dielectric-object proximity-sensing capability;
   a millimeter wave (mmW) antenna;
   wherein the RF antenna and the mmW antenna are coupled to a processor; and
   wherein both the RF antenna the mmW antenna provide signals to the processor which signals are indicative of proximity of an object with a high dielectric constant;
   wherein the processor time stamps the signals from the RF antenna and the mmW antenna; and
   wherein the processor combines the time-stamped signals from the RF antenna and the mmW antenna to distinguish proximity of an inanimate object from proximity of a human tissue object; and
   wherein the processor produces an RF power reduction signal responsively to signals which are indicative of proximity of human tissue object within a predetermined distance from the RF antenna.

9. A method for controlling power output from an electronic communication device, comprising the steps of:
   generating object-proximity signals by sensing proximity of an object with a proximity sensing RF antenna;
   generating distance-to-object signals with a millimeter wave (mmW) antenna;
   sending the object-proximity and the distance-to-object signals to a processor;
   time stamping the object-proximity and the distance-to-object signals in the processor;
   combining, in the processor, the time-stamped object-proximity and the distance-to-object signals to distinguish proximity of an inanimate object from proximity of a human tissue object; and
   reducing RF power output from the electronic communication device responsively to the signals by a dynamic power reduction signal from the processor only when the object is human tissue.

10. The method of claim 9 wherein the step of reducing RF power output from the electronic communication device further comprises the step of sending the power reduction signal from the processor to a transceiver of the electronic device.

11. The method of claim 9 wherein the step of combining further comprises:
   selecting one of the stamped times;
   selecting the one of the object-proximity signals with the selected time stamp;
   selecting the one of the distance-to-object signals with the selected time stamp; and
   comparing the selected time stamped object-proximity signal and the selected time stamped distance-to-object signal to predetermined values for said signals, which predetermined values are stored in a non-volatile memory of the processor.

12. The method of claim 11 wherein the predetermined values are stored in a look-up table.

* * * * *